United States Patent
Fujii et al.

(10) Patent No.: US 12,054,419 B2
(45) Date of Patent: Aug. 6, 2024

(54) COVER GLASS

(71) Applicant: AGC Inc., Tokyo (JP)

(72) Inventors: Kensuke Fujii, Tokyo (JP); Shinji Kobune, Tokyo (JP); Minoru Tamada, Tokyo (JP); Hitoshi Mishiro, Tokyo (JP)

(73) Assignee: AGC Inc., Tokyo (JP)

( * ) Notice: Subject to any disclaimer, the term of this patent is extended or adjusted under 35 U.S.C. 154(b) by 508 days.

(21) Appl. No.: 17/335,309

(22) Filed: Jun. 1, 2021

(65) Prior Publication Data
US 2021/0284571 A1   Sep. 16, 2021

Related U.S. Application Data

(63) Continuation of application No. 15/404,609, filed on Jan. 12, 2017, now abandoned, which is a
(Continued)

(30) Foreign Application Priority Data

Jul. 16, 2014  (JP) ................. 2014-146264
Jul. 16, 2014  (JP) ................. 2014-146265

(51) Int. Cl.
*C03C 17/34*       (2006.01)
*C03C 3/083*       (2006.01)
(Continued)

(52) U.S. Cl.
CPC .......... *C03C 17/3417* (2013.01); *C03C 3/083* (2013.01); *C03C 3/085* (2013.01);
(Continued)

(58) Field of Classification Search
CPC ................. C03C 15/00; C03C 21/02; C03C 2217/73–734; C03C 2217/76
See application file for complete search history.

(56) References Cited

U.S. PATENT DOCUMENTS 2,337,460 A * 12/1943 French .................... C03C 15/00
                                                   216/99
2,401,537 A *  6/1946 Adams .................... C03C 15/00
                                                   427/160
(Continued)

FOREIGN PATENT DOCUMENTS

CN      101591139 A     12/2009
CN      102627407 A      8/2012
(Continued)

OTHER PUBLICATIONS

International Search Report issued Sep. 8, 2015 in PCT/JP2015/070084 filed on Jul. 13, 2015 (with English translation).
(Continued)

*Primary Examiner* — Erin Snelting
(74) *Attorney, Agent, or Firm* — Oblon, McClelland, Maier & Neustadt, L.L.P.

(57) ABSTRACT

A cover glass includes: a glass substrate having a convex and concave shape formed on at least one of surfaces thereof by an antiglare treatment; and an antireflection film disposed on the surface of the glass substrate, the surface having the convex and concave shape. In the cover glass, a difference $\Delta a^*$ in $a^*$ value between any two points within a surface of the cover glass on the side where the antireflection film is present and a difference $\Delta b^*$ in $b^*$ value between any two points within the surface of the cover glass on the side where the antireflection film is present satisfy the following expression: $\sqrt{\{(\Delta a^*)^2+(\Delta b^*)^2\}} \leq 4$.

11 Claims, 2 Drawing Sheets

Related U.S. Application Data continuation of application No. PCT/JP2015/070084, filed on Jul. 13, 2015.

(51) Int. Cl.

| | |
|---|---|
| *C03C 3/085* | (2006.01) |
| *C03C 3/087* | (2006.01) |
| *C03C 4/18* | (2006.01) |
| *C03C 15/00* | (2006.01) |
| *C03C 17/42* | (2006.01) |
| *C03C 21/00* | (2006.01) |
| *C09D 1/00* | (2006.01) |
| *C09D 5/00* | (2006.01) |
| *C09D 5/16* | (2006.01) |
| *G02B 1/115* | (2015.01) |
| *G02B 27/00* | (2006.01) |
| *G02B 5/02* | (2006.01) |

(52) U.S. Cl.
CPC ............... *C03C 3/087* (2013.01); *C03C 4/18* (2013.01); *C03C 15/00* (2013.01); *C03C 17/42* (2013.01); *C03C 21/002* (2013.01); *C09D 1/00* (2013.01); *C09D 5/006* (2013.01); *C09D 5/1675* (2013.01); *G02B 1/115* (2013.01); *G02B 27/0006* (2013.01); *C03C 2204/00* (2013.01); *C03C 2217/218* (2013.01); *C03C 2217/734* (2013.01); *C03C 2218/154* (2013.01); *C03C 2218/31* (2013.01); *G02B 5/0268* (2013.01)

(56) References Cited

U.S. PATENT DOCUMENTS

| | | | | |
|---|---|---|---|---|
| 2,461,840 | A * | 2/1949 | Nicoll | C03C 15/00 216/73 |
| 4,019,884 | A * | 4/1977 | Elmer | G02B 1/113 216/99 |
| 4,080,188 | A * | 3/1978 | Doddato | C03C 15/00 65/111 |
| 4,086,074 | A * | 4/1978 | Minot | G02B 1/113 65/111 |
| 4,273,826 | A * | 6/1981 | McCollister | G09F 7/18 428/318.6 |
| 4,693,910 | A * | 9/1987 | Nakajima | C03C 15/00 427/75 |
| 5,952,084 | A | 9/1999 | Anderson et al. | |
| 2003/0079500 | A1* | 5/2003 | Umeyama | C03C 19/00 65/30.14 |
| 2004/0005482 | A1 | 1/2004 | Kobayashi et al. | |
| 2007/0279750 | A1 | 12/2007 | Yaoita | |
| 2007/0286994 | A1 | 12/2007 | Walker | |
| 2009/0197048 | A1 | 8/2009 | Amin | |
| 2009/0298669 | A1 | 12/2009 | Akiba et al. | |
| 2011/0267698 | A1 | 11/2011 | Guilfoyle | |
| 2012/0218640 | A1 | 8/2012 | Gollier et al. | |
| 2013/0130004 | A1 | 5/2013 | Milia et al. | |
| 2013/0164521 | A1* | 6/2013 | Myoung | H01G 9/20 428/312.6 |
| 2013/0271836 | A1 | 10/2013 | Fukaya et al. | |
| 2014/0335335 | A1 | 11/2014 | Koch, III | |
| 2015/0210588 | A1* | 7/2015 | Chang | B32B 17/06 428/220 |
| 2017/0327418 | A1 | 11/2017 | Gollier et al. | |

FOREIGN PATENT DOCUMENTS

| | | |
|---|---|---|
| CN | 103226211 A | 7/2013 |
| CN | 103626400 A | 3/2014 |
| JP | 61-36140 | 2/1986 |
| JP | 2003-215309 | 7/2003 |
| JP | 2013-70093 | 4/2013 |
| KR | 10-2014-0009413 A | 1/2014 |
| WO | WO 2014/061614 A1 | 4/2014 |

OTHER PUBLICATIONS

Written Opinion issued Sep. 8, 2015 in PCT/JP2015/070084 filed on Jul. 13, 2015.

* cited by examiner

COVER GLASS

CROSS REFERENCES TO RELATED APPLICATIONS

This application is a continuation of U.S. patent application Ser. No. 15/404,609 filed on Jan. 12, 2017, which is a continuation of International Application No. PCT/JP2015/070084 filed on Jul. 13, 2015, and is based on Japanese Patent Application No. 2014-146264 filed on Jul. 16, 2014 and a Japanese Patent Application No. 2014-146265 filed on Jul. 16, 2014, the entire contents of these applications are incorporated herein by reference in their entireties.

TECHNICAL FIELD

The present invention relates to a cover glass.

BACKGROUND ART

In recent years, image display devices are coming to be increasingly used in various appliances, e.g., navigation systems and speedometers, to be mounted on vehicles, etc. The properties required of the cover glasses of such image display devices include diminishing the reflection of external light and preventing external light from being reflected in the screen and thereby rendering the images less visible, from the standpoints of safety and appearance improvement.

As a means for preventing light or images from being reflected by or in surfaces of transparent substrates such as glasses, a glass substrate surface is subjected to an antiglare treatment (AG treatment). For example, as a known method, a glass substrate surface is subjected to a chemical or physical surface treatment to form irregularities and this surface is then etched with, for example, hydrofluoric acid in order to arrange the surface shape (Patent Document 1).

Also known as a means for preventing light or images from being reflected by or in a glass surface is a technique for reflection prevention which reduces surface reflection. Having been proposed as a technique for reflection prevention is one in which several layers each having appropriate values of refractive index and optical film thickness are laminated as optical interference layers to thereby reduce light reflection occurring at the interface between the laminate and air (Patent Document 2).

PRIOR ART DOCUMENTS

Patent Documents

Patent Document 1: JP-A-S61-36140
Patent Document 2: JP-A-2003-215309

SUMMARY OF THE INVENTION

Problems to be Solved by the Invention

It is thought that in cases where an antiglare treatment and the formation of an antireflection film are both performed, the reflection by or in the glass surface can be more effectively prevented. However, there is a possibility that the methods described above might have a problem in that the color tone of the glass is uneven and varies, that is, unevenness in color results. This problem is thought to arise due to the following.

In the course of the antiglare treatment, there are cases where an extremely thin layer which is deficient in cationic components of the glass and which is called a leach-out layer is unevenly formed in the surface of the glass substrate. The leach-out layer differs from the glass substrate in refractive index. Consequently, in cases where an antireflection film is further formed thereon, the leach-out layer behaves as if this layer is a low-refractive-index layer unevenly interposed between the antireflection film and the glass substrate. The unevenness in color is thought to thus result.

An object of the present invention is to provide a cover glass which is less apt to suffer color tone unevenness even when produced through both an antiglare treatment and formation of an antireflection film.

Means for Solving the Problems

The present inventors have found that the above problem(s) could be solved by the cover glass having no leach-out layer. That is, the present invention relates to the following cover glass.

[1] A cover glass comprising: a glass substrate having a convex and concave shape formed on at least one of surfaces thereof by an antiglare treatment; and an antireflection film disposed on the surface of the glass substrate, the surface having the convex and concave shape, wherein
a difference $\Delta a^*$ in $a^*$ value between any two points within a surface of the cover glass on the side where the antireflection film is present and a difference $\Delta b^*$ in between any two points within the surface of the cover glass on the side where the antireflection film is present satisfy the following expression (1).

$$\sqrt{\{(\Delta a^*)^2+(\Delta b^*)^2\}} \leq 4 \qquad (1)$$

[2] The cover glass according to [1], wherein the $\Delta a^*$ and the $\Delta b^*$ are determined by selecting any square portion of 10 cm$^2$ as a measuring range from the glass substrate, dividing the measuring range into 11×11 equal portions, examining all 100 intersections of equally dividing lines for $a^*$ values and $b^*$ values, determining a maximum value $a^*_{max}$ of the $a^*$ values, a minimum value $a^*_{min}$ of the $a^*$ values, a maximum value $b^*_{max}$ of the $b^*$ values, and a minimum value $b^*_{min}$ of the $b^*$ values, from the $a^*$ values and $b^*$ values, and taking a difference $(a^*_{max}-a^*_{min})$ between the $a^*_{max}$ and the $a^*_{min}$ as the $\Delta a^*$ and a difference $(b^*_{max}-b^*_{min})$ between the $b^*_{max}$ and the $b^*_{min}$ as the $\Delta b^*$.

[3] The cover glass according to [1] or [2], wherein the glass substrate has a microcrack(s) having a maximum depth of less than 3 μm on the surface thereof, the surface having the convex and concave shape.

[4] The cover glass according to any one of [1] to [3], wherein the surface of the cover glass, which has the convex and concave shape, has a degree of ion exchange of 1% or more and 25% or less.

[5] The cover glass according to [4], wherein the degree of ion exchange is a degree of ion exchange determined using aluminum as an index.

[6] The cover glass according to any one of [1] to [5], which has a haze of 1% to 35%.

[7] The cover glass according to any one of [1] to [6], wherein the antireflection film is a laminate comprising one or more layers containing niobium and one or more layers containing silicon.

[8] The cover glass according to any one of [1] to [7], which has a luminous reflectance of 2% or less.

[9] The cover glass according to any one of [1] to [8], further comprising an antifouling film disposed on the antireflection film, wherein a contact angle of water on a surface of the cover glass on the side where the antifouling film is present is 90° or larger.

Effects of the Invention

According to the present invention, a cover glass in which reflection by or in the glass surface is little and which is reduced in color tone unevenness is provided.

MODES FOR CARRYING OUT THE INVENTION

Figure 1A:
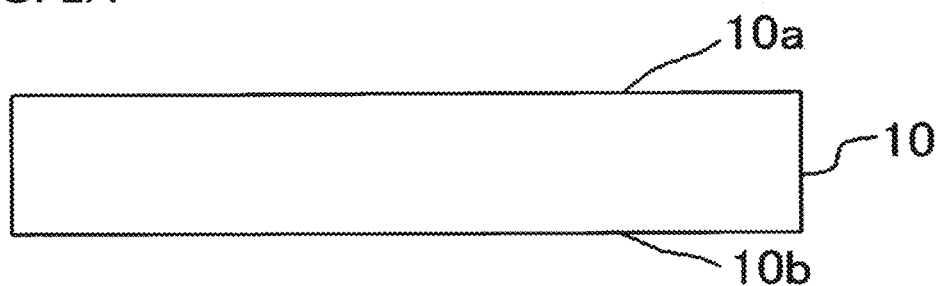
FIG. 1A to FIG. 1D are a flowchart which shows steps of one embodiment of the production process in the present invention.

The cover glass of the present invention includes: a glass substrate having a convex and concave shape formed on at least one of surfaces thereof by an antiglare treatment; and an antireflection film disposed on the surface of the glass substrate, the surface having the convex and concave shape, and in the cover glass, a difference $\Delta a^*$ in $a^*$ value between any two points within a surface of the glass on the side where the antireflection film is present and a difference $\Delta b^*$ in $b^*$ value between any two points within the surface of the glass on the side where the antireflection film is present satisfy the following expression (1).

$$\sqrt{\{(\Delta a^*)^2+(\Delta b^*)^2\}} \leq 4 \quad (1)$$

Expression (1) is an index to a color distribution in the glass surface. In cases where the left side of the expression is 4 or less, this means that differences in the color distribution in the glass surface are small, that is, the color tone variation is narrow. Expression (1) is preferably 3 or less, more preferably 2 or less.

The $\Delta a^*$ in expression (1) can be determined by selecting any two points within the glass surface of the cover glass on the side where the antireflection film is present and calculating the difference between measured two $a^*$ values for the points. The $\Delta b^*$ can be calculated in the same manner. $a^*$ and $b^*$ are luminous reflectances obtained from spectral reflectances measured by examining, with a spectrophotometric colorimeter, the surface of the substrate which has undergone an antiglare treatment and an antireflection treatment (JIS Z 8729 (2004)).

Specifically, it is preferable that the $\Delta a^*$ and the $\Delta b^*$ should be determined by selecting any square portion of 10 cm$^2$ as a measuring range from the glass substrate, dividing the measuring range into 11×11 equal portions, examining all 100 intersections of equally dividing lines for $a^*$ values and $b^*$ values, determining a maximum value $a^*_{max}$ of the $a^*$ values, a minimum value $a^*_{min}$ of the $a^*$ values, a maximum value $b^*_{max}$ of the $b^*$ values, and a minimum value $b^*_{min}$ of the $b^*$ values, from the $a^*$ values and $b^*$ values, and taking the difference ($a^*_{max}-a^*_{min}$) between the $a^*_{max}$ and the $a^*_{min}$ as the $\Delta a^*$ and the difference ($b^*_{max}-b^*_{min}$) between the $b^*_{max}$ and the $b^*_{min}$ as the $\Delta b^*$.

The shape of the measuring range is not limited to square, so long as the measuring range has an area of 10 cm$^2$. In the case of a measuring range which is not square, 100 measuring points may be suitably selected so that distributions of luminous reflectances $a^*$ and $b^*$ in the measuring range can be recognized.

The cover glass of the present invention can satisfy the expression (1) because no leach-out layer is present on the glass substrate. The term "leach-out" means a phenomenon in which when a glass surface is treated with a strong acid or the like, cations present in a surface layer part of the glass undergo an exchange reaction with H$^+$ ions of the acid and the surface layer part of the glass thus comes to differ in composition from the bulk. The extremely thin layer thus formed in the surface and having a different composition is called a leach-out layer. Examples of methods for avoiding the presence of a leach-out layer include a method of removing the leach-out layer formed by an antiglare treatment, a method of conducting an antiglare treatment which is less apt to result in formation of a leach-out layer, and the like.

The cover glass of the present invention has a degree of ion exchange of desirably 25% or less, preferably 23% or less, more preferably 20% or less, even more preferably 15% or less, especially preferably 10% or less. The degree of ion exchange thereof is preferably 1% or higher. The degree of ion exchange is defined as a value obtained by dividing the content of cations of any kind in the extremely thin surface region of the glass by the content of cations of the same kind in the bulk part of the glass, and is an index to the degree of deficiency of cations in the glass.

Examples of the cation component include sodium, potassium, and aluminum. The term "extremely thin surface region of the glass" means a region ranging from the glass surface to 5 nm. The term "bulk part" means a region extending inward from a depth of 30 nm from the glass surface. In the case where the glass is soda-lime glass, it is preferred to use sodium for the index. In the case of aluminosilicate glass, it is preferred to use aluminum or potassium for the index. In this application, aluminum was used for the index in the case of aluminosilicate glass. So long as the degree of ion exchange is within that range, the difference in refractive index between the bulk part and the extremely thin surface region is sufficiently negligible and deposition of an antireflection film thereon exerts a negligible influence on the spectrum.

The glass composition of the extremely thin surface region can be determined, for example, by X-ray photoelectron spectroscopy (XPS). The glass composition of the bulk part can be determined, for example, by XPS, X-ray fluorescence analysis (XRF), etc.

The thickness of the ion-exchange layer before the removal, i.e., the leach-out layer, as measured from the outermost surface of the glass substrate is preferably 10 nm or less, more preferably 8 nm or less, even more preferably 6 nm or less. It is also preferable that the thickness of the ion-exchange layer before the removal, i.e., the leach-out layer, should be larger than 1 nm. So long as the thickness of the leach-out layer before the removal is 10 nm or less, not only this leach-out layer can be efficiently removed, but also a suitable antiglare effect and even reflection properties can be finally obtained. So long as the thickness of the leach-out layer before the removal is larger than 1 nm, the minimum necessary antiglare effect and even reflection properties can be obtained. Such leach-out layer thicknesses are hence preferred.

<Glass Substrate>

As the glass substrate in the present invention, any of glasses having various compositions can be utilized.

For example, it is preferable that the glass to be used in the present invention should contain sodium and have a composition which renders the glass formable and capable of being strengthened by a chemical strengthening treatment. Specific examples thereof include aluminosilicate glass, soda-lime glass, borosilicate glass, lead glass, alkali-barium glasses, and aluminoborosilicate glass.

The composition of the glass in the present invention is not particularly limited, but examples thereof include the following glass compositions.

(i) A glass including, in terms of % by mole, from 50% to 80% of $SiO_2$, from 2% to 25% of $Al_2O_3$, from 0% to 10% of $Li_2O$, from 0% to 18% of $Na_2O$, from 0% to 10% of $K_2O$, from 0% to 15% of MgO, from 0% to 5% of CaO, and from 0% to 5% of $ZrO_2$ (ii) A glass which includes, in terms of % by mole, from 50% to 74% of $SiO_2$, from 1% to 10% of $Al_2O_3$, from 6% to 14% of $Na_2O$, from 3% to 11% of $K_2O$, from 2% to 15% of MgO, from 0% to 6% of CaO, and from 0% to 5% of $ZrO_2$, and in which a total content of $SiO_2$ and $Al_2O_3$ is 75% or less, a total content of $Na_2O$ and $K_2O$ is 12% to 25%, and a total content of MgO and CaO is 7% to 15%

(iii) A glass including, in terms of % by mole, from 68% to 80% of $SiO_2$, from 4% to 10% of $Al_2O_3$, from 5% to 15% of $Na_2O$, from 0% to 1% of $K_2O$, from 4% to 15% of MgO, and from 0% to 1% of $ZrO_2$ (iv) A glass which includes, in terms of % by mole, from 67% to 75% of $SiO_2$, from 0% to 4% of $Al_2O_3$, from 7% to 15% of $Na_2O$, from 1% to 9% of $K_2O$, from 6% to 14% of MgO, and from 0% to 1.5% of $ZrO_2$ and in which a total content of $SiO_2$ and $Al_2O_3$ is 71% to 75%, a total content of $Na_2O$ and $K_2O$ is 12% to 20%, and the content of CaO, if it is contained, is less than 1%

Processes for producing the glass are not particularly limited. The glass can be produced by introducing desired raw materials for glass into a continuous melting furnace, heating and melting the raw materials for glass preferably at 1,500° C. to 1,600° C., clarifying the melt, feeding the clarified melt to a forming device to form the molten glass into a plate shape, and gradually cooling the formed glass.

Various methods can be employed for forming the glass. Usable examples of various forming methods includes downdraw processes (e.g., overflow downdraw process, slot-down process, and redraw process), float process, rolling-out process, and pressing.

The thickness of the glass is not particularly limited. However, in the case of performing a chemical strengthening treatment, the thickness of the glass is usually preferably 5 mm or less, more preferably 3 mm or less, from the standpoint of effectively conducting the treatment.

It is preferable that the glass substrate should have been chemically strengthened from the standpoint of enhancing the strength of the cover glass. The chemical strengthening is conducted after an antiglare treatment and before the formation of an antireflection film. A specific method therefor will be described later in the section of process for production.

<Antiglare Treatment>

In the cover glass of the present invention, at least one of the surfaces of the glass substrate has undergone an antiglare treatment (referred to also as "AG treatment"). Methods for the antiglare processing are not particularly limited, and usable examples thereof include a method in which a main surface of the glass is subjected to a surface treatment to form desired irregularities.

Specifically, examples of the method include a method in which a first main surface of the glass substrate is subjected to a chemical treatment, e.g., a frosting treatment. The frosting treatment can be conducted, for example, by immersing the glass substrate, as an object to be treated, in a mixed solution of hydrogen fluoride and ammonium fluoride to chemically treat the surface immersed therein.

Usable examples of besides methods based on such a chemical treatment include methods based on a physical treatment such as, for example, the so-called sand blasting in which a crystalline silicon dioxide powder, silicon carbide powder, or the like is blown against the surface of the glass substrate by compressed air or grinding with a brush equipped with bristles which have a crystalline silicon dioxide powder, silicon carbide powder, or the like adhered thereto and which have been moistened with water.

Especially in the method in which a frosting treatment is given to chemically treat the glass substrate surface with a liquid chemical such as, for example, hydrogen fluoride, microcracks are less apt to be formed in the surface of the object being treated and a decrease in mechanical strength is less apt to occur. This method can hence be advantageously used as a method for treating the glass substrate surface. That surface of the glass substrate on which irregularities have been formed by the antiglare treatment may have microcracks having a maximum depth of less than 3 μm. This is because microcracks of such a size are less apt to cause a decrease in mechanical strength.

After irregularities are thus formed by a chemical surface treatment (frosting treatment) or a physical surface treatment, the glass surface is generally etched chemically in order to arrange the surface shape. By this etching, the haze can be regulated to a desired value in accordance with the etching amount and the cracks formed by the sand blasting or the like can be eliminated. Furthermore, glittering can be reduced.

Examples of preferred methods for the etching include a method of immersing the glass substrate, as an object to be treated, in a solution which includes hydrogen fluoride as a main component. This solution may contain an acid such as hydrochloric acid, nitric acid, or citric acid as a component other than hydrogen fluoride. Due to the inclusion of the acid, cationic components contained in the glass can be inhibited from reacting with the hydrogen fluoride and thereby locally causing a precipitation reaction, and the etching can hence be allowed to proceed evenly throughout the surface.

With respect to the surface shape after the AG treatment, the surface roughness (RMS) is preferably 0.01 μm to 0.5 μm, more preferably 0.01 μm to 0.3 μm, even more preferably 0.01 μm to 0.2 μm.

The RMS can be determined in accordance with the method as provided for in JIS B 0601 (2001). Specifically, a laser microscope (trade name VK-9700, manufactured by Keyence Corp.) was used to examine a measuring surface of a specimen with respect to a field of view having an area set at 300 μm×200 μm to acquire height information on the substrate, and a value of RMS was determined by subjecting the acquired data to a cut-off correction and calculating a root mean square of the heights obtained. When conducting this measurement, it is preferred to use 0.08 mm as a cut-off value. It is preferable that circular holes having a size of 10 μm or less should be observed in the specimen surface.

When the size of the circular holes is within such a range, it is possible to attain both prevention of glittering and antiglare properties.

It is thought that a leach-out layer is formed in this etching step. In particular, it is thought that the presence of an acid causes cationic components present in the glass surface to selectively dissolve away and thereby renders a leach-out layer prone to be formed in the glass surface. It is therefore preferable that especially in the case where the process includes a step in which etching is performed using a solution containing an acid, the leach-out layer should be removed after the step as will be described later.

<Antireflection Film>

The cover glass of the present invention has an antireflection film disposed on the antiglare-treated surface of the glass substrate by performing an antireflection film treatment (referred to also as "AR treatment").

The material of the antireflection film is not particularly limited, and any of various materials capable of inhibiting the reflection of light can be utilized. For example, the antireflection film may have a configuration composed of laminated layers including a high-refractive-index layer and a low-refractive-index layer. The high-refractive-index layer herein is a layer having a refractive index at a wavelength of 550 nm of 1.9 or higher, while the low-refractive-index layer is a layer having a refractive index at a wavelength of 550 nm of 1.6 or less.

Figure 1B:
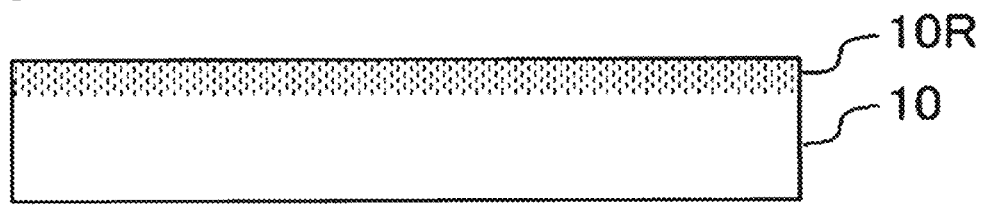
Figure 1C:
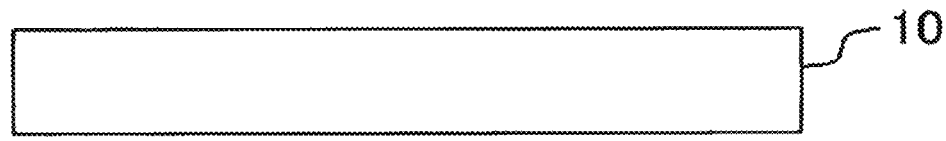
Figure 1D:
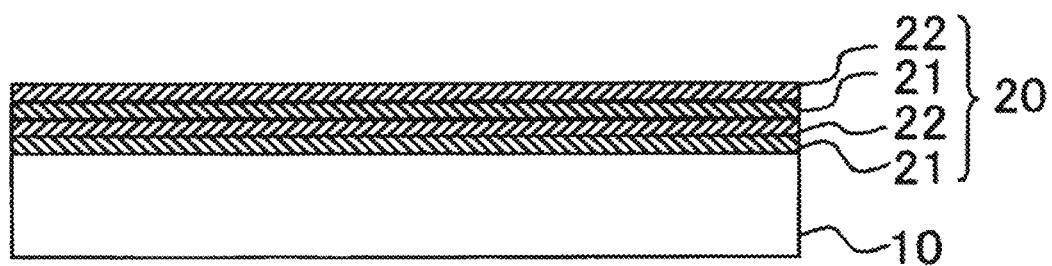
Figure 2A:
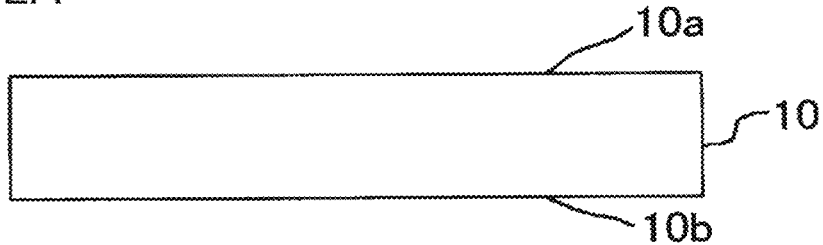
FIG. 2A to FIG. 2F are a flowchart which shows steps of another embodiment of the production process in the present invention.
Figure 2B:
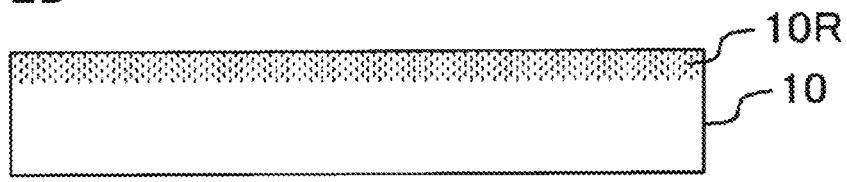
Figure 2C:
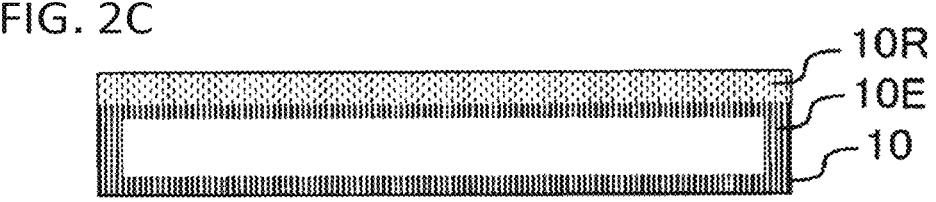
Figure 2D:
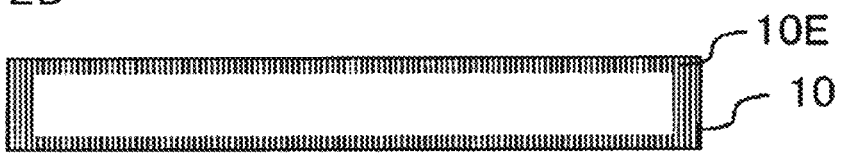
Figure 2E:
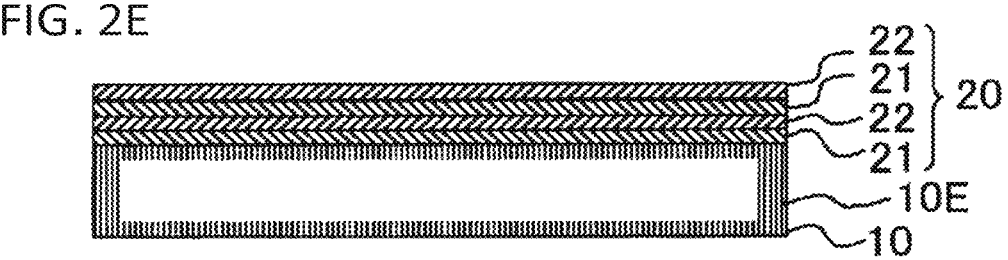
Figure 2F:
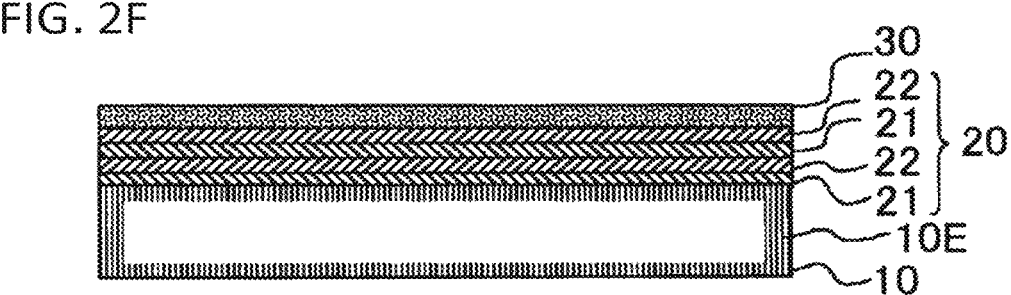

The antireflection film may include one high-refractive-index layer and one low-refractive-index layer, or may have a configuration including two or more high-refractive-index layers and two or more low-refractive-index layers as indicated by layers 21 and 22 in FIGS. 1D, 2E and 2F. In the case where the antireflection film includes two or more high-refractive-index layers and two or more low-refractive-index layers, it is preferable that this antireflection film should be one in which the high-refractive-index layers and the low-refractive-index layers have been alternately laminated.

Especially from the standpoint of enhancing the antireflection performance, it is preferable that the antireflection film should be a laminate formed by laminating a plurality of layers. For example, the laminate is preferably composed of two to six laminated layers in total, and more preferably is composed of two to four laminated layers in total. This laminate is preferably a laminate composed of laminated layers including one or more high-refractive-index layers and one or more low-refractive-index layers as described above, and it is preferable that the total number of the high-refractive-index layers and the low-refractive-index layers should be within that range.

The materials of each high-refractive-index layer and each low-refractive-index layer are not particularly limited, and can be selected while taking account of the required degree of reflection prevention, production efficiency, etc. As the material which constitutes the high-refractive-index layer, a material containing one or more elements selected from niobium, titanium, zirconium, tantalum, and silicon can, for example, be advantageously utilized. Specific examples thereof include niobium oxide ($Nb_2O_5$), titanium oxide ($TiO_2$), zirconium oxide ($ZrO_2$), tantalum oxide ($Ta_2O_5$), and silicon nitride. As the material which constitutes the low-refractive-index layer, a material containing silicon can, for example, be advantageously utilized. Specific examples thereof include silicon oxide ($SiO_2$), a material including a mixed oxide of Si and Sn, a material including a mixed oxide of Si and Zr, and a material including a mixed oxide of Si and Al.

From the standpoints of production efficiency and the degree of refractive index, it is more preferable that the high-refractive-index layer should be a layer selected from a niobium-containing layer and a tantalum-containing layer, and the low-refractive-index layer should be a silicon-containing layer, and it is even more preferable that the high-refractive-index layer should be constituted of a niobium-containing layer. Namely, it is preferable that the antireflection film should be a laminate including one or more niobium-containing layers and one or more silicon-containing layers.

In the cover glass of the present invention, the antiglare treatment and the formation of an antireflection film on at least one of the main surfaces of the glass substrate suffice. However, the cover glass may have a configuration in which antiglare irregularities and an antireflection film are disposed on each of both main surfaces of the glass substrate as needed.

Methods for forming the antireflection film will be described in detail in the section of process for production.

<Antifouling Film>

The cover glass of the present invention may have an antifouling film (referred to also as "anti finger print (AFP) film") on the antireflection film, from the standpoint of protecting the glass surface. The antifouling film can be constituted, for example, of a fluorine-containing organosilicon compound. Fluorine-containing organosilicon compounds which impart antifouling properties, water repellency, and oil repellency can be used without particular limitations. Examples thereof include fluorine-containing organosilicon compounds having one or more groups selected from the group consisting of polyfluoropolyether groups, polyfluoroalkylene groups, and polyfluoroalkyl groups. The term "polyfluoropolyether group" means a divalent group having a structure in which a polyfluoroalkylene group and an etheric oxygen atom have been alternately bonded.

Specific examples of the fluorine-containing organosilicon compounds having one or more groups selected from the group consisting of polyfluoropolyether groups, polyfluoroalkylene groups, and polyfluoroalkyl groups include compounds represented by the following general formulae (I) to (V).

[Chem. 1]

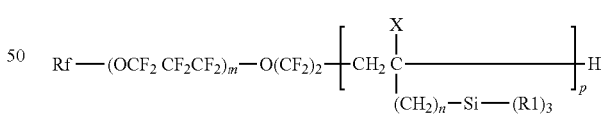

(I)

In the formula, Rf is a linear polyfluoroalkyl group having 1 to 16 carbon atoms (examples of the alkyl group include methyl, ethyl, n-propyl, isopropyl, and n-butyl); X is a hydrogen atom or a lower alkyl group having 1 to 5 carbon atoms (e.g., methyl, ethyl, n-propyl, isopropyl, n-butyl, etc.); R1 is a hydrolyzable group (e.g., amino, an alkoxy, etc.) or a halogen atom (e.g., fluorine, chlorine, bromine, iodine, etc.); m is an integer of 1 to 50, preferably 1 to 30; n is an integer of 0 to 2, preferably 1 or 2; and p is an integer of 1 to 10, preferably 1 to 8.

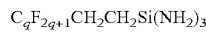 (II)

In the formula, q is an integer of 1 or larger, preferably 2 to 20.

Examples of the compounds represented by general formula (II) include n-trifluoro(1,1,2,2-tetrahydro)propylsilazane (n-CF$_3$CH$_2$CH$_2$Si(NH$_2$)$_3$) and n-heptafluoro(1,1,2,2-tetrahydro)pentylsilazane (n-C$_3$F$_7$CH$_2$CH$_2$Si(NH$_2$)$_3$).

$$C_{q'}F_{2q'+1}CH_2CH_2Si(OCH_3)_3 \qquad (III)$$

In the formula, q' is an integer of 1 or larger, preferably 1 to 20.

Examples of the compounds represented by general formula (III) include 2-(perfluorooctyl)ethyltrimethoxysilane (n-C$_8$F$_{17}$CH$_2$CH$_2$Si(OCH$_3$)$_3$).

[Chem. 2]

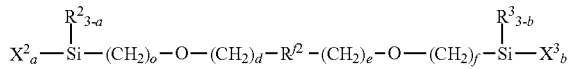
$$X^2{}_a\!-\!\underset{\underset{R^2{}_{3-a}}{|}}{Si}\!-\!(CH_2)_o\!-\!O\!-\!(CH_2)_d\!-\!R^{f2}\!-\!(CH_2)_e\!-\!O\!-\!(CH_2)_f\!-\!\underset{\underset{R^3{}_{3-b}}{|}}{Si}\!-\!X^3{}_b \qquad (IV)$$

In the formula (IV), $R^{f2}$ is a divalent linear polyfluoropolyether group represented by —(OC$_3$F$_6$)$_s$—(OC$_2$F$_4$)$_t$—(OCF$_2$)$_u$— (s, t, and u are each independently an integer of 0 to 200), and $R^2$ and $R^3$ are each independently a monovalent hydrocarbon group having 1 to 8 carbon atoms (e.g., methyl, ethyl, n-propyl, isopropyl, n-butyl, etc.). $X_2$ and $X_3$ are each independently a hydrolyzable group (e.g., an amino, alkoxy, acyloxy, alkenyloxy, or isocyanate group, etc.) or a halogen atom (e.g., a fluorine, chlorine, bromine, or iodine atom, etc.); d and e are each independently an integer of 1 or 2; c and f are each independently an integer of 1 to 5 (preferably 1 or 2); and a and b are each independently 2 or 3.

In $R^{f2}$ possessed by compound (IV), s+t+u is preferably 20 to 300, more preferably 25 to 100. It is more preferable that $R^2$ and $R^3$ should be methyl, ethyl, or butyl. The hydrolyzable groups represented by $X^2$ and $X^3$ are more preferably alkoxy groups having 1 to 6 carbon atoms, and especially preferably methoxy or ethoxy. Furthermore, it is preferable that a and b each should be 3.

[Chem. 3]

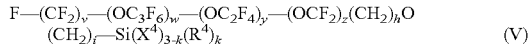
$$F\!-\!(CF_2)_v\!-\!(OC_3F_6)_w\!-\!(OC_2F_4)_y\!-\!(OCF_2)_z(CH_2)_hO \\ (CH_2)_i\!-\!Si(X^4)_{3-k}(R^4)_k \qquad (V)$$

In the formula (V), v is an integer of 1 to 3; w, y, and z are each independently an integer of 0 to 200; h is 1 or 2; i is an integer of 2 to 20; $X^4$ is a hydrolyzable group; $R^4$ is a linear or branched hydrocarbon group having 1 to 22 carbon atoms; and k is an integer of 0 to 2. The value of w+y+z is preferably 20 to 300, more preferably 25 to 100. It is more preferable that i should be 2 to 10. $X^4$ is preferably an alkoxy group having 1 to 6 carbon atoms, more preferably methoxy or ethoxy. $R^4$ is more preferably an alkyl group having 1 to 10 carbon atoms.

Commercial products of the fluorine-containing organosilicon compounds having one or more groups selected from the group consisting of polyfluoropolyether groups, polyfluoroalkylene groups, and polyfluoroalkyl groups include KP-801 (trade name; manufactured by Shin-Etsu Chemical Co., Ltd.), KY178 (trade name; manufactured by Shin-Etsu Chemical Co., Ltd.), KY-130 (trade name; manufactured by Shin-Etsu Chemical Co., Ltd.), KY-185 (trade name; manufactured by Shin-Etsu Chemical Co., Ltd.), and Optool (registered trademark) DSX and Optool AES (both being trade names; manufactured by Daikin Industries, Ltd.). These commercial products can be advantageously used.

The antifouling film is laminated on the antireflection film. In the case where an antireflection film has been deposited on each of both main surfaces of the glass substrate, the antifouling film can be formed on each of both antireflection films. However, a configuration in which the antifouling film is laminated on only either of the two antireflection films may be used. This is because the formation of an antifouling film at least on the portion where contact with human fingers, etc. is possible suffices. The formation can be selected in accordance with the intended use, etc.

<Contact Angle>

It is preferable that the cover glass of the present invention should have a contact angle of water of 90° or larger. Thus, the cover glass surface has water repellency and oil repellency, and this cover glass is less apt to suffer adhesion of fouling substances thereto. Examples of means for regulating the contact angle thereof to 90° or larger include disposing the antifouling film.

<Haze>

The haze of the cover glass of the present invention is preferably 1% to 35%, more preferably 2% to 35%, even more preferably 2% to 25%. So long as the haze is within that range, a cover glass which has the desired antiglare properties and, despite this, exerts little influence on the resolution of the display object can be obtained. The haze is provided for in JIS K 7136.

The haze can be controlled by regulating the etching period in the AG treatment.

<Reflectance>

It is preferable that the cover glass of the present invention should have a luminous reflectance of 2% or less. So long as the luminous reflectance thereof is within that range, reflection in the cover glass surface can be sufficiently prevented. The luminous reflectance is provided for in JIS Z8701. As the illuminant, illuminant D65 was used.

<Process for Production of the Cover Glass>

The cover glass of the present invention can be produced, for example, by the following steps, but usable production processes are not limited thereto. Step 1, antiglare treatment; step 2, chemical strengthening; step 3, leach-out layer removal; step 4, antireflection film formation; step 5, antifouling film formation.

The chemical strengthening as step 2, the leach-out layer removal as step 3, and the antifouling film formation as step 5 each can be conducted according to need. A printing treatment can also be performed according to need.

It is preferable that the chemical strengthening treatment as step 2 should be conducted between the antiglare treatment as step 1 and the antireflection film formation as step 4. The chemical strengthening as step 2 and the leach-out layer removal as step 3 may be conducted in the reverse order. However, from the standpoint of minimizing substances adherent to the glass substrate which is to be subjected to the antireflection film formation, it is preferred to conduct the leach-out layer removal just before the antireflection film formation.

The printing treatment is a treatment in which, when the cover glass is required to be decorated, a pattern according to intended uses or applications, as in, for example, frame printing or logo printing, is printed in suitably selected color(s). Although any of known printing methods is applicable, screen printing, for example, is suitable.

It is preferable that the printing treatment should be conducted between the antiglare treatment as step 1 and the antireflection film formation as step 4 and after the leach-out layer removal as step 3, in order to prevent the printed portion from being affected by the etching or other treatment for the leach-out layer removal.

In the case where a chemical strengthening treatment and a printing treatment are both performed, it is preferred to conduct the chemical strengthening treatment, leach-out layer removal, and printing treatment in this order.

It is preferable that the antifouling film formation should be conducted after the final step, that is, after the antireflection film formation, because the antifouling film is a film formed in order to protect the glass surface.

In FIG. 1A to FIG. 1D show a flowchart of steps which shows one embodiment of the production process in the present invention. Of the main surfaces 10a and 10b of a glass substrate 10, the main surface 10a is subjected to an antiglare treatment (FIG. 1A). The glass surface 10a which has undergone the antiglare treatment not only has irregularities formed therein (not shown) but also is in such a state that cations contained in the glass have been replaced with H ions contained in the acid, thereby forming a leach-out layer 10R in a surface layer part (FIG. 1B). This leach-out layer 10R is removed by at least one method selected from between etching and grinding (FIG. 1C). This treatment for removing the leach-out layer does not result in elimination of the irregularities formed by the antiglare treatment. An antireflection film 20 is further formed on the glass main surface 10a from which the leach-out layer has been removed (FIG. 1D).

In FIG. 2A to FIG. 2F shows a flowchart of steps which shows another embodiment of the production process in the present invention. An antiglare treatment is given to a main surface 10a of a glass substrate 10, and the glass surface 10a which has undergone the antiglare treatment has irregularities formed therein (not shown) and has a leach-out layer 10R formed therein (FIG. 2A and FIG. 2B). Subsequently, this glass substrate is chemically strengthened to thereby form a compressive stress layer 10E as a surface layer in the glass substrate (FIG. 2C). The compressive stress layer 10E is formed to an extent of a larger depth than the leach-out layer 10R. Thereafter, the leach-out layer 10R is removed (FIG. 2D), and an antireflection film 20 is formed on the surface which has undergone the antiglare treatment (FIG. 2E). Furthermore, an antifouling film 30 is formed on the antireflection film 20 (FIG. 2F).

Each step is explained below.

<Step 1: Antiglare Treatment>

A specific method for antiglare treatment is as described above in detail in the explanation of the cover glass. Namely, at least one of the surfaces of a glass substrate is subjected to a chemical surface treatment or a physical surface treatment to thereby form irregularities and then etched with either a hydrogen fluoride solution or a solution containing both hydrogen fluoride and an acid, thereby performing an antiglare treatment.

It is preferable that shaping according to applications, e.g., machining such as cutting, edge surface machining, and drilling, should be performed before the glass substrate is subjected to the chemical strengthening described below.

<Step 2: Chemical Strengthening>

For the chemical strengthening, conventional methods can be utilized. For example, chemical strengthening by so-called ion exchange is possible, in which metal ions having a small ionic radius (e.g., Na ions) contained in the glass are replaced by metal ions having a larger ionic radius (e.g., K ions) to thereby yield a compressive stress layer in the glass surface and thus improve the strength of the glass.

Specifically, the glass substrate which has undergone the antiglare treatment is immersed in one or more molten salts to form a compressive stress layer in the surfaces of the glass. Examples of the molten salts include inorganic potassium slats. The inorganic potassium salts preferably are ones which are in a molten state at temperatures not higher than the strain point (usually 500° C. to 600° C.) of the glass to be chemically strengthened. For example, it is preferable that the molten salts should include potassium nitrate (melting point, 330° C.). Inorganic potassium salts other than potassium nitrate may be contained as molten slats. Examples thereof include combinations with one or more salts selected from alkali sulfates and alkali chlorides, such as potassium sulfate and potassium chloride, and potassium carbonate and the like.

The temperature at which the glass is preheated depends on the temperature at which the chemical strengthening treatment is to be conducted (temperature of the slat bath). However, the preheating temperature is generally preferably 100° C. or higher.

It is preferable that the temperature for the chemical strengthening treatment of the glass should be not higher than the strain point (usually 500° C. to 600° C.) of the glass to be strengthened. From the standpoint of obtaining a larger compressive-stress depth (depth of layer; DOL), the chemical strengthening temperature is preferably 350° C. or higher.

The immersion period during which the glass is immersed in the molten salts is preferably 10 minutes to 12 hours, more preferably 30 minutes to 10 hours. So long as the immersion period is within that range, a chemically strengthened glass having an excellent balance between strength and the depth of the compressive stress layer can be obtained.

As a chemical-strengthening tank for conducting the chemical strengthening treatment therein, metals, quartz, ceramics, and the like can be used. Of these, metallic materials are preferred from the standpoint of durability. From the standpoint of corrosion resistance, stainless steel (SUS) materials are preferred.

<Step 3: Leach-Out Layer Removal>

In the case where the antiglare treatment has resulted in the formation of a leach-out layer on the glass surface, this leach-out layer is removed. Specifically, examples of methods therefor include a chemical method in which the glass surface is, for example, etched with a liquid chemical and a physical method in which the glass surface is, for example, ground with an abrasive material.

Examples of methods for the etching include a method in which the glass substrate is subjected to an acid treatment, a method in which the glass substrate is subjected to an alkali treatment, or a method in which the glass substrate is subjected to an acid treatment and then an alkali treatment.

The acid treatment is conducted by immersing the glass substrate in an acidic solution.

The acidic solution is not particularly limited so long as the pH thereof is lower than 7, and either a weak acid or a strong acid may be used. Specifically, preferred acids are hydrofluoric acid, hydrochloric acid, nitric acid, sulfuric acid, phosphoric acid, acetic acid, oxalic acid, carbonic acid, citric acid, and the like. These acids may be used alone or in combination of two or more thereof. It is preferable that the acid treatment should be conducted at a temperature of 100° C. or lower, although the temperature varies depending on the kind and concentration of the acid used and on the period.

The period of the acid treatment varies depending on the kind and concentration of the acid used and on the temperature. However, the period thereof is preferably 10 seconds to 5 hours from the standpoint of production efficiency, and is more preferably 1 minute to 2 hours.

The concentration of the solution with which the acid treatment is performed varies depending on the kind of the acid used, period, and temperature, but preferably is such a concentration that there is no possibility of corroding the vessel. Specifically, concentrations of 1 wt % to 20 wt % are preferred.

In the acid treatment step, the leach-out described above also occurs simultaneously. A relationship with etching rate is hence important. Specifically, it is preferred to use concentration and temperature conditions under which the etching rate is at least 1.5 times the rate of leach-out layer formation. The etching rate is more preferably at least 2 times, even more preferably at least 2.5 times, the rate of leach-out layer formation.

The alkali treatment is conducted by immersing the glass substrate in an alkaline solution.

The alkaline solution is not particularly limited so long as the pH thereof exceeds 7, and either a weak base or a strong base may be used. Specifically, preferred bases are sodium hydroxide, potassium hydroxide, potassium carbonate, sodium carbonate, and the like. These bases may be used alone or in combination of two or more thereof.

The temperature at which the alkali treatment is to be conducted varies depending on the kind and concentration of the base used and on the period, but is preferably 0° C. to 100° C., more preferably 10° C. to 80° C., especially preferably 20° C. to 60° C. Such temperature range is preferred since there is no possibility of corroding the glass.

The period of the alkali treatment varies depending on the kind and concentration of the base used and on the temperature. However, the period thereof is preferably 10 seconds to 20 hours from the standpoint of production efficiency, and is more preferably 1 minute to 12 hours, even more preferably 10 minutes to 5 hours.

The concentration of the solution with which the alkali treatment is performed varies depending on the kind of the base used, period, and temperature, but preferably is 1 wt % to 20 wt % from the standpoint of glass surface removal.

In the case where an alkali treatment is conducted after an acid treatment, the glass substrate which has undergone the acid treatment described above is successively subjected to an alkali treatment. The acid treatment and the alkali treatment may be conducted under the same conditions as shown above.

Although any of the methods described above may be selected as the chemical removal method, the method in which an alkali treatment is conducted after an acid treatment is preferred from the standpoint of ease of removal of the leach-out layer.

Examples of methods for grinding with an abrasive material include a method in which a grinding fluid containing an abrasive material selected from calcium carbonate, cerium oxide, colloidal silica, and the like is used to grind the surface of the glass substrate.

When the leach-out layer is removed by the chemical removal method, it is preferred to remove a glass substrate surface layer down to a depth of 3 nm or larger, preferably 5 nm or larger, more preferably 10 nm or larger. In the case of the physical removal method, it is preferred to remove a glass substrate surface layer down to a depth of 5 nm or larger, preferably 10 nm or larger, more preferably 30 nm or larger. So long as a surface layer is removed in such amount, the leach-out layer can be sufficiently removed. However, from the standpoint that the surface shape formed by the antiglare treatment is kept substantially unchanged, a preferred upper limit of removal amount is 2 μm.

Either the chemical removal method or the physical removal method may be selected. However, the chemical removal method is preferred because the chemical removal method does not form cracks or the like in the glass surface and is free from the possibility that an abrasive material residue might foul the glass surface. The chemical removal method and the physical removal method may be conducted in combination.

<Step 4: Antireflection Film Formation>

Methods for depositing an antireflection film are not particularly limited, and any of various deposition methods can be utilized. It is especially preferred to deposit the film by a method such as pulse sputtering, AC sputtering, digital sputtering, or the like. By these methods, a dense antireflection film can be formed and durability can be ensured.

When the deposition is conducted, for example, by pulse sputtering, an antireflection film can be deposited on the glass substrate by disposing the glass substrate in a chamber filled with a mixed gas atmosphere constituted of a mixture of an inert gas and oxygen gas and by using targets suitably selected so as to result in desired compositions.

In this step, the kind of the inert gas in the chamber is not particularly limited, and any of various inert gases including argon and helium can be used.

The pressure of the inert gas/oxygen mixed gas in the chamber is not particularly limited. However, it is preferred to regulate the pressure thereof so as to be 0.5 Pa or lower, since such a pressure makes it easy to yield an antireflection film having surface roughness within a preferred range. The reason for this is thought to be as follows. In cases where the pressure of the inert gas/oxygen mixed gas in the chamber is 0.5 Pa or lower, an average free path of film-forming molecules is ensured and the film-forming molecules carrying a larger amount of energy arrive at the substrate. Because of this, rearrangement of film-forming molecules is accelerated and a relatively dense film having a smooth surface is formed. There is no particular lower limit on the pressure of the inert gas/oxygen mixed gas within the chamber, but the pressure thereof is, for example, preferably 0.1 Pa or higher.

A preferred range of the surface roughness of the antireflection film is approximately the same as the preferred range for the surface shape obtained through the antiglare treatment. This is because the thickness of the antireflection film itself is as small as 100 nm to 300 nm at the most and, hence, the size of the irregularities of the antireflection film itself is so small as compared with the size of the irregularities formed by the antiglare treatment, which are present beneath the antireflection film layer, that the size thereof is negligible. Consequently, it can be thought that the surface roughness of the antireflection film on the substrate which has undergone the antiglare treatment is determined substantially by the surface roughness of the substrate which has undergone the antiglare treatment.

<Step 5: Antifouling Film Formation>

Methods for depositing an antifouling film in this embodiment are not particularly limited. However, it is preferred to deposit the film by vacuum deposition using any of the fluorine-containing organosilicon compound materials mentioned above.

In general, fluorine-containing organosilicon compounds are stored in the form of a mixture with a solvent, such as a fluorochemical solvent, for the purpose of, for example, inhibiting the deterioration due to reaction with atmospheric moisture. However, in cases where a fluorine-containing organosilicon compound in the state of containing the solvent is subjected to a deposition step, this organosilicon compound may adversely affect the durability and other properties of the thin film obtained therefrom.

It is therefore preferable that either a fluorine-containing organosilicon compound which has undergone a solvent removal treatment before being heated in a heating vessel or a fluorine-containing organosilicon compound which has not been diluted with a solvent (i.e., which contains no solvent added thereto) should be used in this embodiment. For example, it is preferred to use a fluorine-containing organosilicon compound solution having a solvent concentration of preferably 1 mol % or less, more preferably 0.2 mol % or less. It is especially preferred to use a fluorine-containing organosilicon compound containing no solvent.

Examples of the solvents usable for storing the fluorine-containing organosilicon compound include perfluorohexane, m-xylene hexafluoride ($C_6H_4(CF_3)_2$), hydrofluoropolyethers, and HFE 7200/7100 (trade names; manufactured by Sumitomo 3M Ltd.; IFE 7200 is represented by $C_4F_9C_2H_5$ and HFE 7100 is represented by $C_4F_9OCH_3$).

A treatment for removing the solvent from a solution of a fluorine-containing organosilicon compound in a fluorochemical solvent can be accomplished, for example, by evacuating a vessel which contains the solution of a fluorine-containing organosilicon compound.

The period during which the evacuation is conducted varies depending on the evacuation ability of the evacuation line, vacuum pump, etc., the amount of the solution, etc., and is hence not limited. However, the period thereof may be, for example, about 10 hours or longer.

A treatment for removing the solvent can also be conducted after the solution of a fluorine-containing organosilicon compound is introduced into the heating vessel of a deposition device for antifouling film deposition, by evacuating the heating vessel at room temperature before the heating vessel is heated. It is also possible to remove the solvent beforehand with an evaporator or the like before introduction into the heating vessel.

It is, however, noted that fluorine-containing organosilicon compounds having a low solvent content or containing no solvent are prone to be deteriorated by contact with the air as compared with ones containing a solvent, as stated above.

It is therefore preferable that the atmosphere inside the storage container in which the fluorine-containing organosilicon compound having a low solvent content (or containing no solvent) is stored should be replaced with an inert gas, e.g., nitrogen, before the container is closed. When this fluorine-containing organosilicon compound is used and handled, it is preferred to minimize the time period during which the compound is exposed to or in contact with the air.

Specifically, it is preferable that after the storage container is opened, the fluorine-containing organosilicon compound should be immediately introduced into the heating vessel of the deposition device for antifouling film deposition. It is preferable that after the introduction, the inside of the heating vessel should be made vacuum or replaced with an inert gas, e.g., nitrogen or a rare gas, thereby removing the atmosphere (air) contained in the heating vessel. It is more preferable that the storage container and the heating vessel of the production device should have been connected to each other by a valved pipeline so that the compound can be introduced from the storage container into the heating vessel without coming into with the air.

It is preferable that after the fluorine-containing silicon compound is introduced into the heating vessel and the inside of the heating vessel is thereafter made vacuum or replaced with an inert gas, heating for deposition should be initiated immediately.

In the method for antifouling film deposition described above as an example in the explanation of this embodiment, a fluorine-containing organosilicon compound in a solution state or an undiluted state is used. However, methods for antifouling film deposition are not limited thereto. Examples of the other methods include, for example, a method in which use is made of commercial vapor-deposition pellets obtained by impregnating beforehand a porous metal (e.g., tin or copper) or a fibrous metal (e.g., stainless steel) with a certain amount of a fluorine-containing organosilicon compound (an example of the pellets being Surfclear, manufactured by Canon Optron Inc.). In this case, an antifouling film can be easily deposited using, as a deposition source, the pellets in an amount according to the capacity of the deposition device and the necessary film thickness.

By the production process described above, the cover glass of the present invention can be produced.

EXAMPLES

The present invention is explained below in detail by reference to Examples, but the present invention should not be construed as being limited to the following Examples.

Example 1

A cover glass was produced in the following manner.

As a glass substrate was used DRAGONTRAIL (registered trademark), manufactured by Asahi Glass Co., Ltd.

(1) One of the surfaces of the glass substrate was subjected to an antiglare treatment by frosting treatment in the following manner.

First, an acid-resistant protective film (hereinafter also referred to simply as "protective film") was applied to that surface of the substrate which was not subjected to the antiglare treatment. Subsequently, this substrate was immersed in a 3% by weight solution of hydrogen fluoride for 3 minutes to etch the substrate and thereby remove fouling substances adherent to the surface. The substrate was then immersed for 3 minutes in a mixed solution of 15% by weight hydrogen fluoride and 15% by weight potassium fluoride to conduct a frosting treatment of the surface. Finally, the substrate was immersed in a 10% solution of hydrogen fluoride for 6 minutes to thereby regulate the haze value to 25%. In the present invention, this time period during which the substrate is finally immersed in the hydrogen fluoride solution to regulate the haze value is referred to as etching period.

(2) Next, a chemical strengthening treatment was conducted in the following manner.

The substrate from which the protective film had been removed was immersed for 2 hours in potassium nitrate kept in a molten state by heating at 450° C. Thereafter, the substrate was pulled out of the molten salt and gradually cooled to room temperature over 1 hour, thereby obtaining a chemically strengthened substrate.

(3) This substrate was subsequently immersed in an alkali solution (SUNWASH TL-75, manufactured by Lion Corp.) for 4 hours to remove a leach-out layer present in the surfaces. The amount of the leach-out layer removed was calculated from the glass weights respectively measured before and after the treatment for leach-out layer removal and from the surface area and density of the glass.

(4) Next, an antireflection film was deposited on the surface which had undergone the antiglare treatment, in the following manner.

First, in a vacuum chamber, pulse sputtering was conducted using a niobium oxide target (trade name, NBO Target; manufactured by AGC Ceramics Co., Ltd.) under the conditions of a pressure of 0.3 Pa, frequency of 20 kHz, power density of 3.8 W/cm$^2$, and inversion pulse width of 5 μsec, while introducing thereinto a mixed gas obtained by mixing argon gas with 10% by volume oxygen gas, thereby forming a high-refractive-index layer made of niobium oxide (niobia) and having a thickness of 13 nm on that surface of the glass substrate which had undergone the antiglare treatment.

Subsequently, pulse sputtering was conducted using a silicon target under the conditions of a pressure of 0.3 Pa, frequency of 20 kHz, power density of 3.8 W/cm$^2$ and inversion pulse width of 5 μsec, while introducing a mixed gas obtained by mixing argon gas with 40% by volume oxygen gas, thereby forming a low-refractive-index layer made of silicon oxide (silica) and having a thickness of 35 nm on the high-refractive-index layer.

Next, pulse sputtering was conducted using a niobium oxide target (trade name, NBO Target; manufactured by AGC Ceramics Co., Ltd.) under the conditions of a pressure of 0.3 Pa, frequency of 20 kHz, power density of 3.8 W/cm$^2$, and inversion pulse width of 5 μsec, while introducing a mixed gas obtained by mixing argon gas with 10% by volume oxygen gas, thereby forming a high-refractive-index layer made of niobium oxide (niobia) and having a thickness of 115 nm on the low-refractive-index layer.

Subsequently, pulse sputtering was conducted using a silicon target under the conditions of a pressure of 0.3 Pa, frequency of 20 kHz, power density of 3.8 W/cm$^2$, and inversion pulse width of 5 μsec, while introducing a mixed gas obtained by mixing argon gas with 40% by volume oxygen gas, thereby forming a low-refractive-index layer made of silicon oxide (silica) and having a thickness of 80 nm.

Thus, an antireflection film composed of a total of four laminated layers of niobium oxide (niobia) and silicon oxide (silica) was formed.

<Evaluation of the Glass>

(Luminous Reflectance)

The spectral reflectance of that surface of the glass substrate which was on the side where the antiglare treatment and the antireflection treatment had been performed was measured with a spectrophotometric colorimeter (Type CM-2600d, manufactured by Konica Minolta) in the SCI mode, and a luminous reflectance (value of reflective stimulus Y as provided for in JIS Z8701) was determined from the value of spectral reflectance. The back surface of the glass to be subjected to this measurement was painted in black in order to eliminate reflection from the back surface, which had undergone neither the antiglare treatment nor the antireflection treatment. The illuminant was regarded as illuminant D65 when calculating the reflectance.

(Degree of Ion Exchange)

An X-ray photoelectron spectrometer (Type JPS-9200, manufactured by JEOL Ltd.) was used to determine the degree of ion exchange of the glass surface using aluminum as an index. With this apparatus, the proportion of ions present can be examined along the depth direction. First, the proportion of ions present at a sufficiently large depth from the surface is calculated as a reference. In this measurement, the proportion (A) of ions present at a depth of 30 nm was taken as a reference. The proportion of aluminum ions present at a depth of 5 nm was expressed by (B), and the degree of ion exchange ρ was determined using the following equation.

$$\rho = B/A$$

(Color Distribution)

First, any 10 cm$^2$-square portion within the glass substrate was selected as a measuring range, and this measuring range was divided into 11×11 equal portions. The 100 intersections in the resultant lattice pattern on the substrate were examined for color in the following manner.

The spectral reflectance of that surface of the substrate which was on the side where the antireflection treatment had been performed was measured with a spectrophotometric colorimeter (Type CM-2600d, manufactured by Konica Minolta) in the SCI mode, and a luminous reflectance (color indexes a* and b* as provided for in JIS Z8729) was determined form the value of spectral reflectance. The back surface of the glass to be subjected to this measurement was painted in black in order to eliminate reflection from the back surface, which had undergone neither the antiglare treatment nor the antireflection treatment.

From the maximum values and minimum values of a* and b* (a*$_{max}$, a*$_{min}$, b*$_{max}$, and b*$_{min}$) among the measured values for all the 100 points, the color distribution E was determined using the following calculation formula (1-1).

$$E = \sqrt{\{(a^*_{max} - a^*_{min})^2 + (b^*_{max} - b^*_{min})^2\}} \quad (1\text{-}1)$$

Subsequently, the measuring range was changed, and the same measurement as described above was repeatedly made three times in total. With respect to each measurement, the value of E was determined.

(Contact Angle with Water)

An about 1-μL droplet of pure water was placed on that surface of the glass substrate which was on the side where the antiglare treatment and antireflection treatment had been performed. Using a contact angle meter (device name, DM-51; manufactured by Kyowa Interface Science Co., Ltd.), the contact angle of water was measured.

Example 2

A cover glass was produced in the same manner as in Example 1, except that the period of immersion in the alkali solution in the leach-out layer removal step (3) in Example 1 was changed to 8 hours and that the following antifouling film formation in Example 1 was conducted as step (5). (5) An antifouling film was deposited on the antireflection film in the following manner.

First, an antifouling-film material (trade name, KY-185; manufactured by Shin-Etsu Chemical Co., Ltd.) was introduced into a heating vessel. Thereafter, the heating vessel was evacuated over 10 hours or longer with a vacuum pump to remove the solvent contained in the solution, thereby obtaining a composition for forming fluorine-containing organosilicon compound coating film.

Subsequently, the heating vessel which contained the composition for forming fluorine-containing organosilicon compound film was heated to 270° C. After the temperature of the heating vessel had reached 270° C., the heated state was maintained for 10 minutes until the temperature became stable.

The composition for forming fluorine-containing organosilicon compound film was fed, through a nozzle connected to the heating vessel which contained the composition for forming fluorine-containing organosilicon compound film, to the antireflection film laminated on the transparent substrate disposed in a vacuum chamber, thereby performing deposition.

The deposition was conducted while measuring the film thickness with a quartz oscillator monitor disposed in the vacuum chamber, until the thickness of the fluorine-containing organosilicon compound film formed over the transparent substrate reached 4 nm.

At the time when the thickness of the fluorine-containing organosilicon compound film had reached 4 nm, the feeding of the starting material through the nozzle was stopped. Thereafter, the optical part produced was taken out of the vacuum chamber.

The optical part taken out was placed on a hot plate so that the film surface faced upward, and was thus heat-treated at 150° C. for 60 minutes in the air.

Example 3

A cover glass was produced in the same manner as in Example 1, except that the etching treatment period in the antiglare treatment step (1) in Example 1 was changed to 20 minutes to thereby regulate the haze to 4%, that the period of immersion in the alkali solution in the leach-out layer removal step (3) in Example 1 was changed to 8 hours, and that the antireflection film formation step (4) in Example 1 was conducted by the following method.

Antireflection Film Formation Step:

An antireflection film was deposited on the surface which had undergone the antiglare treatment, in the following manner.

First, pulse sputtering was conducted using a niobium oxide target (trade name, NBO Target; manufactured by AGC Ceramics Co., Ltd.) under the same deposition conditions as in Example 1, thereby forming a high-refractive-index layer made of niobium oxide (niobia) and having a thickness of 15 nm on that surface of the glass substrate which had undergone the antiglare treatment.

Subsequently, pulse sputtering was conducted using a silicon target under the same conditions as in Example 1, thereby forming a low-refractive-index layer made of silicon oxide (silica) and having a thickness of 30 nm on the high-refractive-index layer.

Next, pulse sputtering was conducted using a niobium oxide target (trade name, NBO Target; manufactured by AGC Ceramics Co., Ltd.) under the same deposition conditions as in Example 1, thereby forming a high-refractive-index layer made of niobium oxide (niobia) and having a thickness of 110 nm on that side of the glass substrate which had undergone the antiglare treatment.

Subsequently, pulse sputtering was conducted using a silicon target under the same conditions as in Example 1, thereby forming a low-refractive-index layer made of silicon oxide (silica) and having a thickness of 90 nm on the high-refractive-index layer.

Thus, an antireflection film composed of a total of four laminated layers of niobium oxide (niobia) and silicon oxide (silica) was formed.

Example 4

A cover glass was produced in the same manner as in Example 1, except that the etching treatment period in the antiglare treatment step (1) in Example 1 was changed to 10 minutes to thereby regulate the haze to 10%, that the leach-out layer removal step (3) in Example 1 was conducted by calcium carbonate washing under the following conditions, and that the antireflection film formation step (4) in Example 1 was conducted by the method used in Example 3.

Calcium carbonate washing: A calcium-carbonate abrasive material having an average particle diameter of 1.6 μm (particle size distribution, 0.1 μm to 50 μm) was used as an aqueous solution (slurry) having a concentration of 20% by weight to grind one surface of the substrate with a nylon brush at a grinding pressure of 30 to 50 kPa and a conveying speed of 55 mm/sec, in an amount of about 1 nm.

Example 5

A cover glass was produced in the same manner as in Example 1, except that the leach-out layer removal step (3) in Example 1 was conducted by cerium oxide washing under the following conditions and that the antireflection film formation step (4) in Example 1 was conducted under the following conditions.

Cerium oxide washing: A cerium-oxide abrasive material having an average particle diameter of 1.2-1.8 μm, an aqueous solution (slurry) having a concentration of 4 Be, and a suede pad were used to grind one surface of the substrate 20 times at a grinding pressure of 0.113 MPa and a conveying speed of 20 mm/sec, in an amount of about 1 μm.

Antireflection Film Formation Step:

An antireflection film was deposited on the surface which had undergone the antiglare treatment, in the following manner.

First, in a vacuum chamber, AC sputtering was conducted using two niobium oxide targets (trade name, NBO Target; manufactured by AGC Ceramics Co., Ltd.) at a pressure of 0.3 Pa, frequency of 40 kHz, and power density of 3.8 W/cm$^2$, while introducing thereinto a mixed gas obtained by mixing argon gas with 10% by volume oxygen gas. Thus, a high-refractive-index layer made of niobium oxide (niobia) and having a thickness of 11 nm was formed on that surface of the glass substrate which had undergone the antiglare treatment.

Subsequently, AC sputtering was conducted using two silicon targets at a pressure of 0.3 Pa, frequency of 40 kHz, and power density of 3.8 W/cm$^2$, while introducing a mixed gas obtained by mixing argon gas with 40% by volume oxygen gas, thereby forming a low-refractive-index layer made of silicon oxide (silica) and having a thickness of 40 nm on the high-refractive-index layer.

Next, AC sputtering was conducted using two niobium oxide targets (trade name, NBO Target; manufactured by AGC Ceramics Co., Ltd.) at a pressure of 0.3 Pa, frequency of 40 kHz, and power density of 3.8 W/cm$^2$, while introducing a mixed gas obtained by mixing argon gas with 10% by volume oxygen gas, thereby forming a high-refractive-index layer made of niobium oxide (niobia) and having a thickness of 120 nm on the low-refractive-index layer.

Subsequently, AC sputtering was conducted using two silicon targets at a pressure of 0.3 Pa, frequency of 20 kHz, and power density of 3.8 W/cm$^2$, while introducing a mixed gas obtained by mixing argon gas with 40% by volume oxygen gas, thereby forming a low-refractive-index layer made of silicon oxide (silica) and having a thickness of 95 nm.

Thus, an antireflection film composed of a total of four laminated layers of niobium oxide (niobia) and silicon oxide (silica) was formed.

Example 6

A cover glass was produced in the same manner as in Example 1, except that the period of immersion in the alkali solution in the leach-out layer removal step (3) in Example 1 was changed to 10 hours.

Example 7

A cover glass was produced in the same manner as in Example 1, except that the chemical strengthening step (2) in Example 1 was omitted.

Example 8

A cover glass was produced in the same manner as in Example 1, except that the leach-out layer removal in Example 1 was conducted by etching by immersing the substrate in 10% aqueous NaOH solution for 12 hours.

Example 9

A cover glass was produced in the same manner as in Example 2, except that the leach-out layer removal in Example 2 was conducted by immersing the substrate in 2% aqueous hydrofluoric acid solution for 20 seconds.

Example 10

A cover glass was produced in the same manner as in Example 2, except that the leach-out layer removal in Example 2 was conducted by immersing the substrate in a 13.4% by weight solution of hydrochloric acid for 3 hours, rinsing this substrate with pure water, and subsequently immersing the substrate in 10% aqueous NaOH solution for 4 hours.

Example 11

A cover glass was produced in the same manner as in Example 8, except that the chemical strengthening treatment in Example 8 was omitted.

Example 12

A cover glass was produced in the same manner as in Example 8, except that in the leach-out layer removal, the period of immersion in the NaOH solution in Example 8 was changed to 4 hours.

Comparative Example 1

A cover glass was produced in the same manner as in Example 1, except that the leach-out layer removal step (3) in Example 1 was replaced by pure-water cleaning conducted under the following conditions.

Pure-water cleaning: Pure water was introduced into an immersion tank, and the substrate was immersed therein. An ultrasonic wave of 40 kHz was propagated thereto to clean the substrate for 10 minutes. Thereafter, the substrate was immersed in pure water heated at 60° C., and was then pulled out gradually and dried thereby.

Comparative Example 2

A cover glass was produced in the same manner as in Example 3, except that the leach-out layer removal step (3) in Example 3 was replaced by plasma cleaning conducted under the following conditions.

Plasma cleaning: A plasma generated at the atmospheric pressure was applied to the substrate for 40 seconds under the conditions of a nitrogen ($N_2$) flow rate of 250 liter/min, clean dry air (CDA) flow rate of 0.5 liter/min, and accelerating voltage of 10 kV.

Reference Example 1

A cover glass was produced in the same manner as in Comparative Example 1, except that the antiglare treatment (frosting treatment) in Example 1 was omitted.

Reference Example 2

A cover glass was produced in the same manner as in Example 1, except that the leach-out layer removal in Example 1 was omitted and the antireflection film formation was omitted.

The results of evaluation of the cover glasses thus produced are shown in Table 1 and Table 2.

TABLE 1

| | Example 1 | Example 2 | Example 3 | Example 4 | Example 5 | Example 6 | Example 7 | Example 8 |
|---|---|---|---|---|---|---|---|---|
| Glass | DT | DT | DT | DT | DT | DT | DT (un-strengthened) | DT |
| Size (mm × mm) | 150 × 250 | 150 × 250 | 400 × 600 | 150 × 250 | 150 × 250 | 150 × 250 | 150 × 250 | 150 × 250 |
| Frosting treatment | conducted | conducted | conducted | conducted | conducted | conducted | conducted | conducted |
| Haze | 25% | 25% | 4% | 10% | 25% | 25% | 25% | 25% |
| Leach-out layer removal | alkali immersion 4 hr | alkali immersion 8 hr | alkali immersion 8 hr | calcium carbonate washing | cerium oxide washing | alkali immersion 10 hr | alkali immersion 4 hr | NaOH immersion 12 hr |
| Removal amount | 3 nm | 6 nm | 6 nm | 1 nm | 1 μm | 8 nm | 3 nm | 10 nm |
| Low-reflection film | 4-layer AR1 | 4-layer AR1 | 4-layer AR2 | 4-layer AR2 | 4-layer AR3 | 4-layer AR1 | 4-layer AR1 | 4-layer AR1 |
| AFP film | none | Shin-Etsu | none | none | none | none | none | none |
| Degree of ion exchange | 17% | 14% | 3% | 23% | 11% | 7% | 17% | 7% |
| Color distribution E (first) | 3.6 | 2.3 | 1.5 | 3.3 | 2.2 | 1.9 | 3.2 | 2.3 |
| Color distribution E (second) | 3.2 | 2 | 1.2 | 4 | 2 | 2.2 | 3.2 | — |
| Color distribution E (third) | 4 | 2.3 | 1.8 | 4 | 2.5 | 1.7 | 3.1 | — |

TABLE 1-continued

|  | Example 1 | Example 2 | Example 3 | Example 4 | Example 5 | Example 6 | Example 7 | Example 8 |
|---|---|---|---|---|---|---|---|---|
| Contact angle | 20° | 110° | 20° | 20° | 20° | 20° | 20° | — |
| Luminous reflectance (SCI) | 0.80% | 0.80% | 1% | 1% | 0.70% | 0.80% | 0.80% | 0.80% |

TABLE 2

|  | Example 9 | Example 10 | Example 11 | Example 12 | Comparative Example 1 | Comparative Example 2 | Reference Example 1 | Reference Example 2 |
|---|---|---|---|---|---|---|---|---|
| Glass | DT | DT | DT (un-strengthened) | DT (un-strengthened) | DT | DT | DT | DT |
| Size (mm × mm) | 150 × 250 | 150 × 250 | 150 × 250 | 150 × 250 | 150 × 250 | 400 × 600 | 150 × 250 | 150 × 250 |
| Frosting treatment | conducted | conducted | conducted | conducted | conducted | conducted | not conducted | conducted |
| Haze | 25% | 25% | 25% | 25% | 25% | 4% | 25% | 25% |
| Leach-out layer removal | hydrofluoric acid 20 sec | HCl 3 hr → NaOH 4 hr | NaOH 12 hr | NaOH 4 hr | pure water US | $O_2$ plasma cleaning | pure water US | none |
| Removal amount | 1 μm | 8 nm | 10 nm | 3 nm | — | — | — | — |
| Low-reflection film | 4-layer AR1 | 4-layer AR1 | 4-layer AR1 | 4-layer AR1 | 4-layer AR1 | 4-layer AR2 | 4-layer AR1 | none |
| AFP film | Shin-Etsu | Shin-Etsu | none | none | none | none | none | none |
| Degree of ion exchange | 4% | 7% | 7% | 17% | 27% | 32% | 4% | 27% |
| Color distribution E (first) | 1.9 | 2.5 | 2.6 | 3.6 | 8.7 | 10.6 | 1.9 | 0.2 |
| Color distribution E (second) | — | — | — | — | 7.7 | 12 | 1.7 | — |
| Color distribution E (third) | — | — | — | — | 8 | 9.8 | 1.5 | — |
| Contact angle | 112° | 113° | — | — | 20° | 20° | 20° | — |
| Luminous reflectance (SCI) | 0.80% | 0.80% | 0.80% | 0.80% | 0.80% | 0.80% | 0.80% | 4.0% |

In Reference Example 1, in which an antiglare treatment had not been performed, the values of color distribution E were small and this cover glass hence is less apt to have the problem wherein the glass suffers color tone differences. The color distribution in Reference Example 1 is mainly due to unevenness in the thickness of each of the layers deposited in the deposition step, and indicates that the color tone differences within 10 cm² are sufficiently small. However, it can be seen that in the case where an antiglare treatment and formation of an antireflection film are both performed without removing the leach-out layer, this results in large values of color distribution E and large differences in color tone, as shown in Comparative Example 1 and Comparative Example 2. Thus, the differences in color tone due to the presence of a leach-out layer are clearly distinguished from the color tone unevenness due to a film thickness distribution attributable to the deposition step.

In contrast, the cover glasses of the Examples each showed reduced values of color distribution E, indicating that the differences in color tone have been reduced. It can be seen that this improvement is an effect of the removal of the leach-out layer. Furthermore, since each of the three measurements of color distribution in each Example satisfied E≤4, it can be seen that the glass has high in-plane evenness.

In Example 4, two of the three measurements gave E=4, which is on the limit of the satisfactory range. This is thought to be because grinding with calcium carbonate was conducted in this Example and the amount of the leach-out layer removed was 1 nm, which was smaller than in the other Examples. It is thus preferable that the removal amount should be larger than 1 nm. Furthermore, since calcium carbonate is abrasive grains which are not high in grinding property among abrasive materials and which cannot bring about a large removal amount, it is difficult for calcium carbonate to give results in which the value of color distribution E stably satisfies E≤4. From the standpoint of attempting to remove the leach-out layer by grinding, abrasive grains having sufficient grinding properties, such as cerium oxide, are more preferred, as in Example 5.

While the present invention has been described in detail and with reference to specific embodiments thereof, it will be apparent to one skilled in the art that various changes and modifications can be made therein without departing from the spirit and scope thereof. This application is based on a Japanese patent application filed on Jul. 16, 2014 (Application No. 2014-146264) and a Japanese patent application filed on Jul. 16, 2014 (Application No. 2014-146265), the entire contents thereof being incorporated herein by reference.

DESCRIPTION OF REFERENCE NUMERALS AND SIGN

10 Glass substrate
10R Leach-out layer
20 Antireflection film
30 Antifouling film

The invention claimed is:

1. A method for producing a cover glass, comprising:
performing an antiglare treatment to etch at least one surface of a glass substrate with a solution comprising hydrogen fluoride to obtain a leach-out layer on the at least one surface;
performing a chemical strengthening treatment to form a compressive stress layer in the at least one surface of the glass substrate that has been etched;

subjecting the at least one surface of the glass substrate that has been chemically strengthened to an acid treatment and/or an alkali treatment, thereby removing the leach-out layer from the at least one surface; and subsequently forming an antireflection film on the at least one surface of the glass substrate from which the leach-out layer is removed to obtain the cover glass;

wherein the at least one surface of the glass substrate has a convex and concave shape formed by the antiglare treatment, and the antireflection film on the at least one surface of the glass substrate having the convex and concave shape, wherein a difference $\Delta a^*$ in $a^*$ value between any two points within a surface of the cover glass on a side where the antireflection film is formed and a difference $\Delta b^*$ in $b^*$ value between any two points within the surface of the cover glass on the side where the antireflection film is formed satisfy the following expression (1):

$$\sqrt{\{(\Delta a^*)^2+(\Delta b^*)^2\}} \leq 4 \qquad (1).$$

2. The method according to claim 1, wherein the $\Delta a^*$ and the $\Delta b^*$ are determined by selecting any square portion of 10 cm² as a measuring range from the glass substrate, dividing the measuring range into 11×11 equal portions, examining all 100 intersections of equally dividing lines for $a^*$ values and $b^*$ values, determining a maximum value $a^*_{max}$ of the $a^*$ values, a minimum value $a^*_{min}$ of the $a^*$ values, a maximum value $b^*_{max}$ of the $b^*$ values, and a minimum value $b^*_{min}$ of the $b^*$ values, from the $a^*$ values and $b^*$ values, and taking a difference $(a^*_{max}-a^*_{min})$ between the $a^*_{max}$ and the $a^*_{min}$ as the $\Delta a^*$ and a difference $(b^*_{max}-b^*_{min})$ between the $b^*_{max}$ and the $b^*_{min}$ as the $\Delta b^*$.

3. The method according to claim 1, wherein the at least one surface having the convex and concave shape of the glass substrate comprises at least one microcrack and a maximum depth of the at least one microcrack is less than 3 µm.

4. The method according to claim 1, wherein the chemically strengthened at least one surface of the cover glass having the convex and concave shape has a degree of ion exchange of 1% or more and 25% or less.

5. The method according to claim 4, wherein the cover glass comprises $Al_2O_3$ and the degree of ion exchange is a degree of ion exchange determined by an X-ray photoelectron spectrometer using aluminum ions as an index.

6. The method according to claim 1, wherein the cover glass has a haze of 1% to 35%.

7. The method according to claim 1, wherein the antireflection film is a laminate comprising at least one layer containing niobium and at least one layer containing silicon.

8. The method according to claim 1, wherein the cover glass has a luminous reflectance of 2% or less.

9. The method according to claim 1, wherein the at least one surface of the glass substrate that has been chemically strengthened is subjected to the acid treatment and subsequently to the alkali treatment.

10. The method according to claim 1, further comprising:
forming an antifouling film on or above the at least one surface of the glass substrate after the forming of the antireflection film.

11. The method according to claim 10, wherein a contact angle of water on a surface of the cover glass on a side where the antifouling film is formed is 90° or larger.

* * * * *